United States Patent
Ahrens, Jr. et al.

(10) Patent No.: US 7,339,885 B2
(45) Date of Patent: Mar. 4, 2008

(54) METHOD AND APPARATUS FOR CUSTOMIZABLE SURVEILLANCE OF NETWORK INTERFACES

(75) Inventors: George Henry Ahrens, Jr., Pflugerville, TX (US); Patrick J. Callaghan, Vestal, NY (US); Stephen V. Feustel, Endwell, NY (US); Robert Keith Overton, Olivebridge, NY (US); Richard Jeffrey Planutis, Endicott, NY (US); Alan David Seid, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 10/455,162

(22) Filed: Jun. 5, 2003

(65) Prior Publication Data

US 2004/0246893 A1 Dec. 9, 2004

(51) Int. Cl.
*G01R 31/08* (2006.01)
(52) U.S. Cl. .......................... 370/216; 370/242; 714/4
(58) Field of Classification Search ................. 370/216
See application file for complete search history.

(56) References Cited

U.S. PATENT DOCUMENTS

| 5,267,246 A | 11/1993 | Huang et al. ............... 371/165 |
| 5,341,363 A * | 8/1994 | Hirasawa .................... 370/221 |
| 5,483,637 A | 1/1996 | Winokur et al. ....... 395/183.02 |
| 5,539,877 A | 7/1996 | Winokur et al. ....... 395/183.02 |
| 5,699,511 A * | 12/1997 | Porcaro et al. ............... 714/55 |
| 5,748,884 A * | 5/1998 | Royce et al. ................. 714/57 |
| 6,167,026 A | 12/2000 | Brewer et al. .............. 370/222 |
| 6,504,851 B1 | 1/2003 | Abler et al. ................. 370/466 |
| 7,120,837 B1 * | 10/2006 | Ferris .......................... 714/56 |
| 2002/0145042 A1 | 10/2002 | Knowles et al. ....... 235/462.01 |
| 2004/0153853 A1 * | 8/2004 | Moriki et al. ................. 714/43 |

FOREIGN PATENT DOCUMENTS

JP 10293705 A 11/1998

OTHER PUBLICATIONS

Gatens et al., "Fiber Optic Ethernet Transceiver for Joint Stars Block I GSM", 1991 IEEE, pp. 1086-1090.
Rasche et al., "Configurable Services for Mobile Users", Humboldt University of Berlin, Germany, 8 pp.
Cording, S., "'Bluetooth' Function Intergrated in RISC Microcontroller", Elektronik, vol. 51, No. 9, pp. 44-47, Apr. 30, 2002.

* cited by examiner

*Primary Examiner*—Chau Nguyen
*Assistant Examiner*—Suk Jin Kang
(74) *Attorney, Agent, or Firm*—Duke W. Yee; Diana R. Gerhardt; Wayne P. Bailey

(57) ABSTRACT

A method in a data processing system for monitoring for errors on a network. Responsive to detecting a change in a state of the network, determine whether the change in state is a loss of a communications link to a remote data processing system. If the change in state is a loss of the communications link, determine whether the communications link was established for at least a first period of time to be considered an acceptable connection to the remote data processing system; and create a new serviceable event, if a second period of time passes without reestablishing the communications link to the selected data processing system. Repeat occurrences of identical outages are tracked and multiple detected instances of an outage for different partitions are counted as a single failure in the examples.

9 Claims, 4 Drawing Sheets

100 DATA PROCESSING SYSTEM

METHOD AND APPARATUS FOR CUSTOMIZABLE SURVEILLANCE OF NETWORK INTERFACES

BACKGROUND OF THE INVENTION

1. Technical Field

The present invention related generally to an improved data processing system and in particular to a method and apparatus for processing data. Still more particularly, the present invention provides a method, apparatus, and computer instructions for customizable surveillance of network interfaces.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned resources of a platform in which some resources are not overlapping while other resources may be shared. In particular, global resources, such as power supplies, fans, and system backplanes are shared across all of the partitions, while local resources such as I/O adapters and devices are not shared between partitions. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that certain errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform in which some of these resources are shared and others are unshared.

With respect to hardware resources in a LPAR system, these resources are disjointly shared among various partitions, themselves disjoint, each one seeming to be a stand-alone computer. These resources may include, for example, input/output (I/O) adapters, processors, and hard disk drives. Each partition within the LPAR system may be booted and shutdown over and over without having to power-cycle the whole system.

With respect to reporting of errors that occur in logical partitioned data processing systems or even in non-partitioned data processing systems, recoverable errors are reported through an "in-band" reporting system. The error reports are sent to another data processing system, such as a hardware management console through a communications link, also referred to as a "connection". The reporting of these errors allows for service calls to be made for the data processing system reporting the error if needed. These connections are typically made over a network, such as a local area network, a wide area network, an intranet, or even the Internet. Since the recoverable errors are reported through a network interface, knowing about failures in the error reporting path is extremely important. Presently available monitoring systems may report outages in a LAN before the LAN becomes operationally stable in addition to reporting glitches in the LAN. As a result, undesirable false reporting may occur. The false report may cause a customer to turn off the monitoring system and be exposed to a real outage in the reporting path going undetected.

Therefore, it would be advantageous to have an improved method, apparatus, and computer instructions for monitoring for outages in error reporting paths.

SUMMARY OF THE INVENTION

The present invention provides a method in a data processing system for monitoring for errors on a network. Responsive to detecting a change in a state of the network, determine whether the change in state is a loss of a communications link to a remote data processing system. If the change in state is a loss of the communications link, determine whether the communications link was established for at least a first period of time to be considered an acceptable connection to the remote data processing system. A new serviceable event is created, if a second period of time passes without reestablishing the communications link to the selected data processing system. Repeat occurrences of identical outages are tracked and multiple detected instances of an outage for different partitions are counted as a single failure in the examples.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
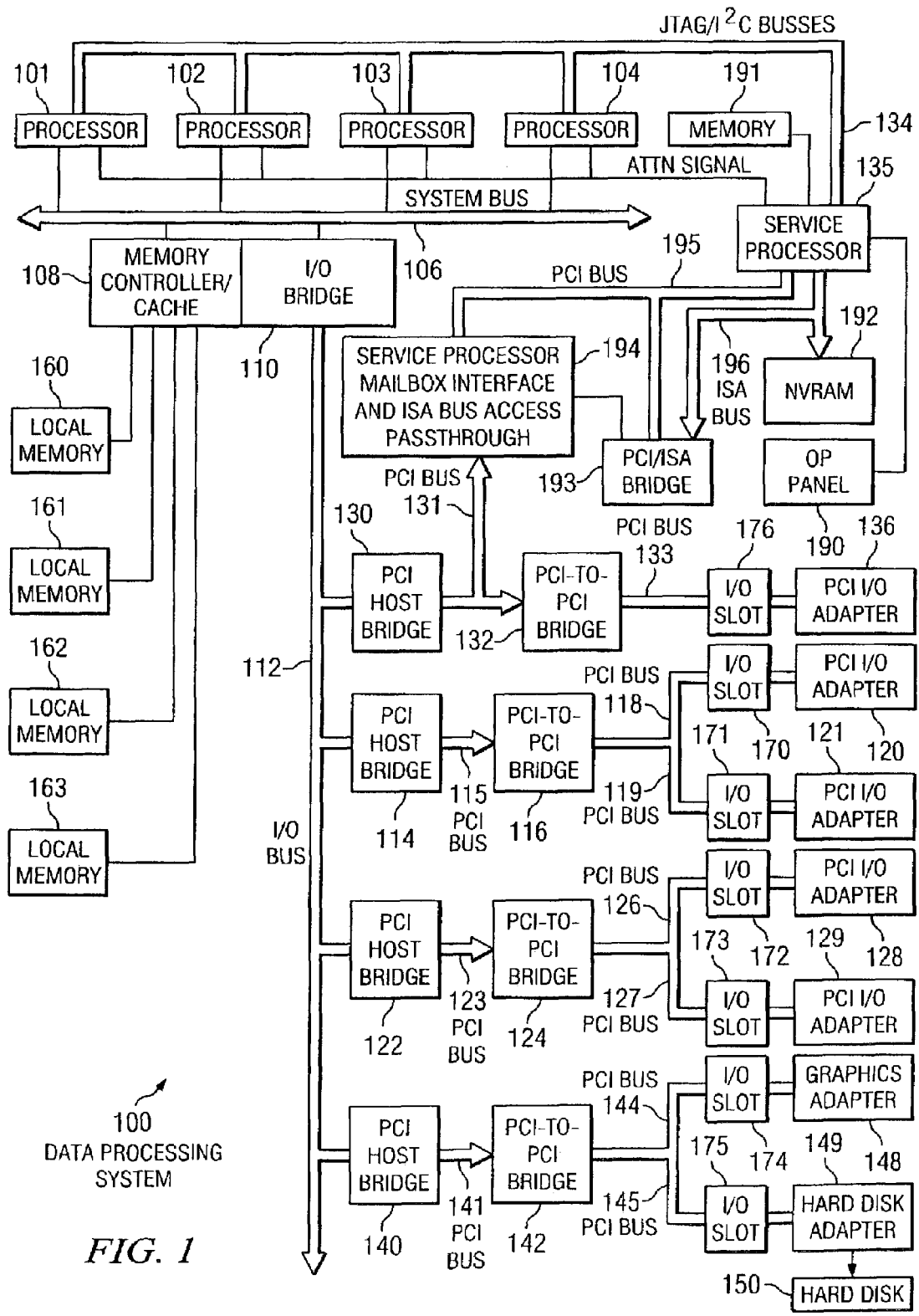
FIG. 1 is a block diagram of hardware components in a data processing system in which the present invention may be implemented.

With reference now to the figures, and in particular with reference to FIG. 1, a block-diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logical partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2. In this example, partition P2 is also a nonwindow operating system. Depending on the particular implementation, the mechanism of the present invention may be used with other operating systems in which windows is supported. For example, a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131, This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer pSeries 690 Model 681 system available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
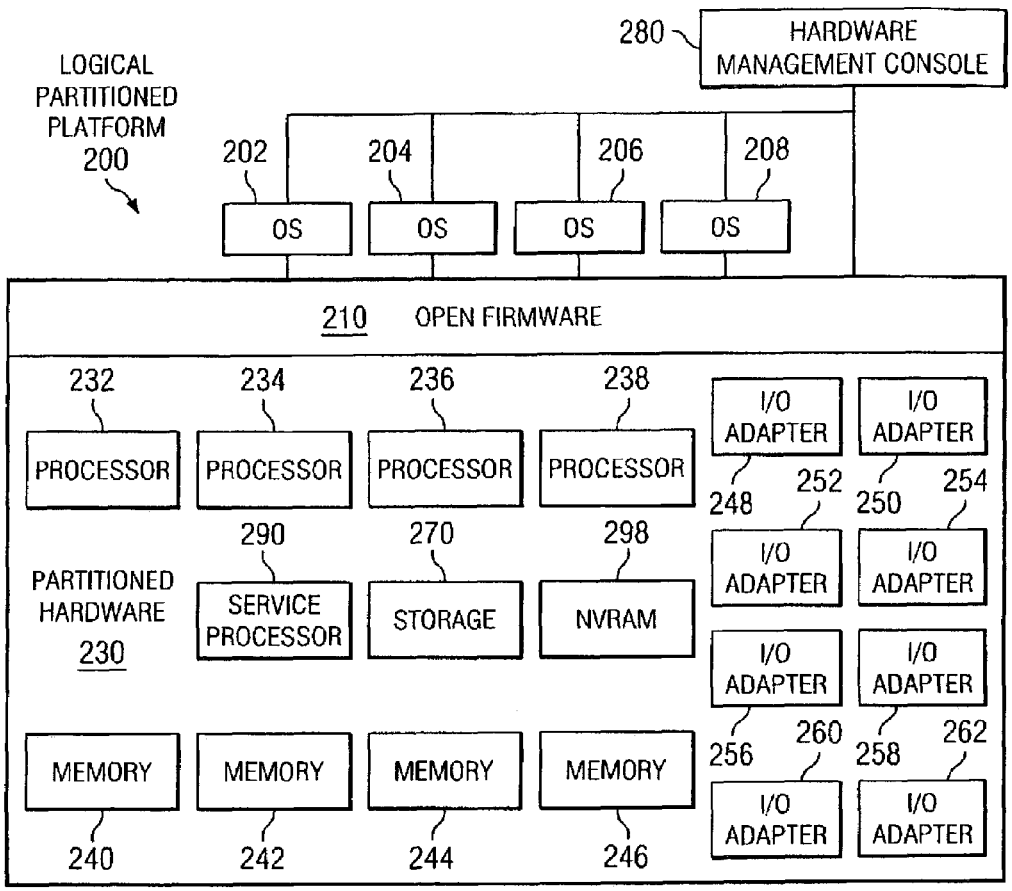
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, Open firmware 210, and operating systems 202-208. Operating systems 202-208 may be multiple copies of a single operating system or multiple heterogeneous operating systems simultaneously run on logical partitioned platform 200.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, and I/O adapters 248-262 may be assigned to one of multiple partitions within logical partitioned platform 200, each of which corresponds to one of operating systems 202-208. NV-RAM is divided between each of the partitions; it is not assigned to any one specific partition.

Open firmware 210 performs a number of functions and services for operating system images 202-208 to create and enforce the partitioning of logical partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (NVRAM).

Open firmware 210 provides the OS images 202-208 running in multiple logical partitions each a virtual copy of a console and operator panel. The interface to the console is changed from an asynchronous teletype port device driver, as in the prior art, to a set of Open Firmware calls that emulate a port device driver. The Open firmware 210 encapsulates the data from the various OS images onto a message stream that is transferred to a computer 280, known as a hardware management console.

Open firmware 210 includes system boot firmware. A mechanism built into each of processors 232-238 as an architected instruction allows system firmware 210 to execute at any time. Thus, system checkpoints may be immediately displayed to the operator panel window on hardware management console 280 and also immediately logged to non-volatile random access memory (NVRAM) even before the I/O path to these devices has been configured to accept any programmed input/output (PIO) accesses. Hardware management console 280 is connected directly to logical partitioned platform 200 as illustrated in FIG. 2, and is connected to logical partitioned platform through a network, such as a local area network (LAN), a wide area network (WAN), an intranet, or even the Internet. Hardware management console 280 may be, for example, a desktop or laptop computer. Hardware management console 280 decodes the message stream and displays the information from the various OS images 202-208 in separate windows, at least one per OS image. Similarly, keyboard input information from the operator is packaged by the hardware management console, sent to logical partitioned platform 200 where it is decoded and delivered to the appropriate OS image via open firmware 210 emulated port device driver associated with the then active window on the hardware management console 280.

Figure 3:
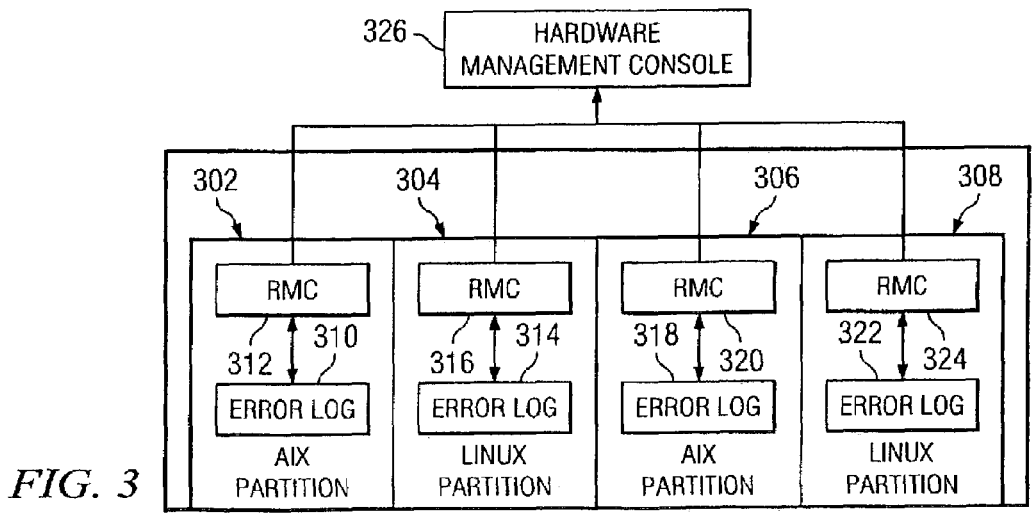
FIG. 3 is a diagram of the logical partitioned multiprocessing server computer system of FIGS. 1 and 2 and a hardware management console in accordance with the present invention.

With reference now to FIG. 3, a block diagram of the logical partitioned multiprocessing server computer system of FIGS. 1 and 2 and a hardware management console in accordance with a preferred embodiment of present invention.

Data processing system 100 includes a plurality of operating system (OS) partitions 302, 304, 306, and 308. These partitions receive inputs from input/output (I/O) devices, and from base hardware, which may be a power supply, a cooling supply, a fan, memory, and processors. Any one of multiple, different operating systems, such as AIX or LINUX, can be running in any partition. For example, AIX is shown in partitions 302 and 306, while LINUX is shown in partitions 304 and 308. Although four operating system partitions are shown, any number of partitions with any one of a variety of different operating systems may be utilized.

Each partition includes an error log and a manager. When an error occurs within a partition, the error is logged into the partition's error log. The manager formats error information into the standard format and forwards the error information in the form of an error event log entry to hardware management console 314. For example, partition 302 includes error log 310 and resource monitor control (RMC) 312; partition 304 includes error log 314 and resource monitor control 316; partition 306 includes error log 318 and resource monitor control 320; and partition 308 includes error log 322 and resource monitor control 324. The resource monitor control is notified of errors and reports the errors to hardware management console 326.

The present invention provides an improved method, apparatus, and computer instructions for surveillance of network interfaces. This monitoring mechanism is especially suitable for monitoring connections used to report errors. The mechanism of the present invention filters out conditions such as those in which the network is not yet stable. The mechanism of the present invention checks to ensure that a connection is made within a certain time period of a partition becoming active. The mechanism of the present invention does not monitor the loss of a connection until the connection is considered an acceptable connection in which the connection has been present for some selected period of time. This parameter may be customized to fit particular network setups. Also, the mechanism of the present invention filters out network glitches. In these examples, a network glitch is any temporary loss of service in the network. These and other features of the present invention allow for a reduction or elimination of nuisance outage reports, such as those caused by LAN instability, that would cause a customer to turn off monitoring and be exposed to an occurrence of a real outage that goes undetected.

Figure 4:
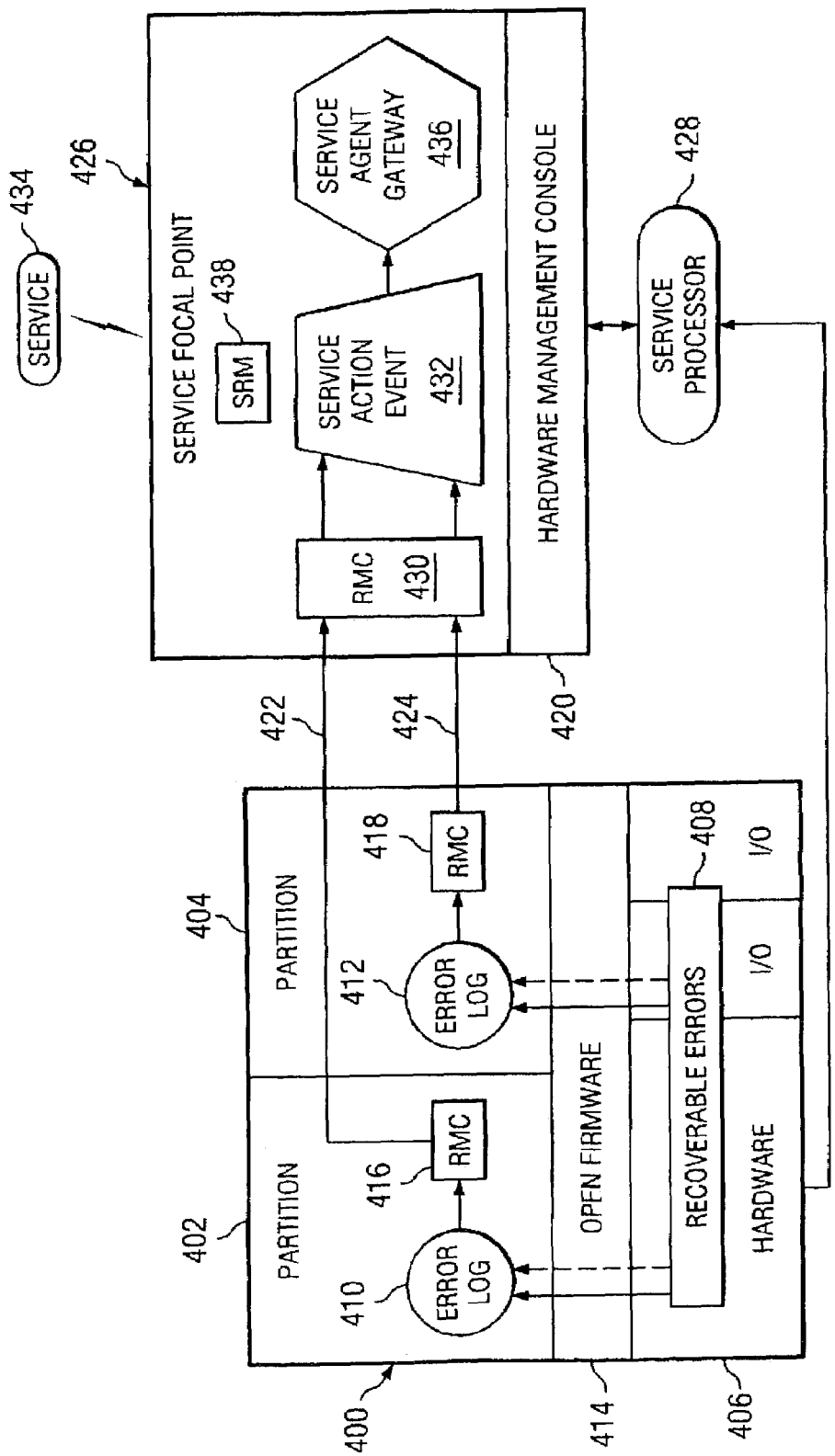
FIG. 4 is a diagram of components used in providing customizable surveillance in accordance with a preferred embodiment of the present invention.

Turning next to FIG. 4, a diagram of components used in providing customizable surveillance is depicted in accordance with a preferred embodiment of the present invention. FIG. 4 provides an illustration of data flow use in monitoring communications links, such as connections to partitions from a hardware management console.

Data processing system 400 includes partition 402 and partition 404. These partitions access hardware 406, which includes components, such as a power supply, cooling fans, memory, I/O adapters, and processors. Recoverable errors 408 are stored in error log 410 and error log 412 through open firmware 414. The entries within error log 410 notifies resource monitor control 416, and entries within error log 412 notifies resource monitor control 418.

These errors are reported to hardware management console 420 through communications links 422 and 424. These communications links, also referred to as "connections" are made over a network, such as a local area network. In these examples, each partition establishes a separate communications link with hardware management console 420. Service focal point 426 receives the reports of errors from resource monitor control 416 and resource monitor control 418 in partitions 402 and 404, respectively. This type of error reporting is referred to as "in-band" reporting. Another type of error reporting is referred to as "out of band" reporting. These errors are reported to hardware management console 420 by service processor 428. These type of errors are fatal errors and the connections are not through a network, such as the in-band reporting of recoverable errors by the partition 402 and partition 404.

With respect to the recoverable errors report though in-band reporting, these reports are received by service focal point 426 through resource monitor control 430. An appropriate service action event, such as service action event 432 is generated. This event is sent service 434 by Service Agent gateway 436.

Service focal point 426 also monitors the state of communications links 422 and 424. In particular, the monitoring is for failures in in-band reporting paths, such as communications links 422 and 424. The monitoring provided filters out glitches in the network through which communications links 422 and 424 are routed. In these examples, communications links 422 and 424 provide a single point of failure for partition 402 and partition 404 for reporting errors. Without these connections, the partitions are unable to report errors and extended error data (EED) would not be reported to service focal point 426.

In the depicted examples, service resource monitor 438 monitors a network connections between each partition for failures in these network connections. Service resource monitor 438 detects when an established connection for a session, such as one between resource monitor control 416 and resource monitor control 430, go down.

Figure 5:
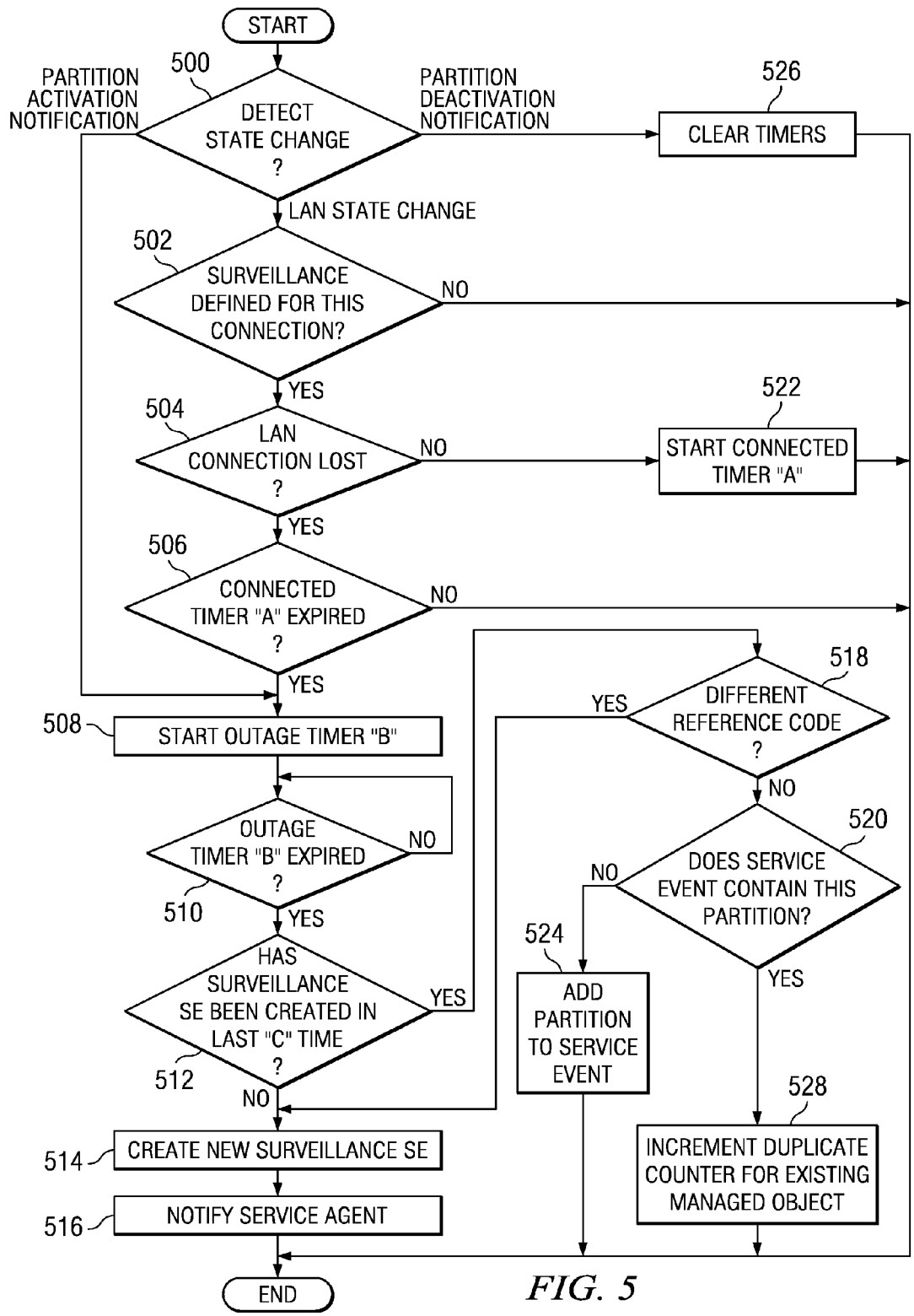
FIG. 5 is a flowchart of a surveillance process in accordance with a preferred embodiment of the present invention.

Turning now to FIG. 5, a flowchart of a surveillance process is depicted in accordance with a preferred embodiment of the present invention. The process illustrated in FIG. 5 may be implemented at a data processing system, such as hardware management console 420 in FIG. 4. In this example, the process is implemented in service resource monitor 438.

The process begins by detecting an event (step 500). One event that may be detected in step 500 is a local area network (LAN) state change for a connection to a particular partition. In these examples, a state change may be either an establishment of a communications link or the loss of this connection assuming that a successful connection has occurred. If the event is a LAN state change, a determination is made if surveillance has been defined or selected with this connection (step 502). Surveillance may be configured for a partition as part of a partition profile setup. Some or all of the partitions may be monitored. If surveillance has been defined for this connection, then a determination is made as to whether the state change is a loss of the LAN connection (step 504). If the LAN connection has been lost, a determination is made as to whether a connected timer "A" has expired (step 506). This step is used to ensure that the connection was established for a sufficient amount of time to be considered an acceptable connection. In other words, this time is used to determine whether a connection actually has been considered to be made. It not enough time has passed the connection is not considered acceptable or one that is actually present. Connections that have lasted for shorter periods of time may indicate that the network is not operationally stable and should be filtered out, rather than generating a notification of a serviceable event. If the connected timer "A" has not expired, the process terminates.

Otherwise, an outage timer "B" is started (step 508). This timer is used to determine if the network change for a connection that has been established long enough to be an acceptable connection is a network glitch. If a new state change occurs before timer "B" expires, the process is started again and nothing is reported with the last change being considered a network glitch.

A determination is then made as to whether the outage timer "B" has expired. The process continues to return to step 508 until this timer expires. This loop may be broken by a change in the state of the network, which causes the entire process to begin again. In fact, a state change in the network will interrupt the process in steps illustrated 500 through 510 in FIG. 5 to restart at step 500.

If outage timer "B" expires, a determination is made as to whether a surveillance serviceable event (SE) was created in the last "C" amount of time (step 512). In this example, "C" is a window of time that is set to look back over some period of time. This step is used to determine if the latest outage has the same root cause as a previous serviceable event. If a surveillance serviceable event has not been created in the last C amount of time, a new surveillance serviceable event is created (step 514), and Service Agent is notified of the event (step 516) with the process terminating thereafter.

Otherwise, a determination is made as to whether a different reference code is present for the surveillance serviceable event (step 518). If a different reference code is present for this event as compared to a prior surveillance serviceable event, a determination is made as to whether the service event contains the partition in which the state change is detected (step 520). Step 520 allows for an implementation such that this process generates only a single report for a particular type of surveillance error even when reported from multiple partitions in the logical partitioned data processing system.

If the service event includes the partition, a duplicate counter is incremented to the existing managed object (step 528) with the process terminating thereafter. As used herein, the managed object is the error report for the partition under surveillance.

With reference again to step 520, if the service event does not contain this partition, the partition is added to the service event (step 524), with the process terminating thereafter. This step allows for service events to be reported for multiple partitions for a particular type of service event. Turning back to step 500, if the event detected is a partition activation notification, the process proceeds to step 508 to start the outage timer. This event causes the process to proceed to step 510 to take into account the activation of a partition that should be monitored in which a successful connection does not occur.

With reference again to step 500, if the event is a partition deactivation notification, the timers are cleared (step 526), with the process terminating thereafter. The timers are cleared to prevent any service events from being generated. In this case, the user has powered down the partition. In other words, the surveillance of the partition is turned off in response to this deactivation of this partition.

Turning back to step 504, if the LAN connection was not lost, then a connected timer A is started (step 522). In this case, the state change is the establishment of the connection. This timer is employed along with step 506 to filter out short term network connections and avoid the generation of multiple serviceable events if the network is restored only for a short period of time. All three of the times "A", "B", and "C" described with reference to FIG. 5 have default values, but may be set by the user for different periods of time depending on the implementation to reflect the stability of the monitored network.

The reference codes generated for surveillance serviceable events are implementation specific. The mechanism of the present invention also provides an interface in the form of a graphical user interface (GUI) to allow an operator to enable or disable surveillance based on the criticality of reporting errors for that partition. The surveillance also may be enabled or disabled for other instances, such as when development partitions are running. These partitions may be brought up and down at different times. The parameters for timers may be tailored for a particular installation and network reliability characteristics.

Thus, the mechanism of the present invention provides an improved method, apparatus, and computer instructions for monitoring for failures in connections. Glitches in the network are filtered out along with making sure that the network is operationally stable. In other words, the connection has to be present for some selected period of time before the connections is considered acceptable for monitoring. Repeat occurrences of identically caused outages are counted as well as reporting new occurrences of outages for different failure causes.

The mechanism of the present invention detects a number of different types of outages, such as an outage due to a partition being down or a communication path to the partition being down. In these examples, the outage of surveillance on a partition is reported only if the partition is active and surveillance is enabled for the partition. Outages due to authentication failures may be detected with the present invention. Also, outages due to the resource monitor control on the hardware management console may be detected as well as other types of outages.

This mechanism may be applied to other types of paths other than those for reporting errors. Further, the mechanism may be applied to any type of network or telecommunications network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for monitoring for errors on a network, the method comprising:
   responsive to detecting a change in a state of the network, determining whether the change in state is one of (i) a loss of a communications link to a remote data processing system and (ii) a re-establishment of the communication link to the remote data processing system;
   if the change in state is the re-establishment of the communications link, starting a connection timer, wherein the connection timer is used to filter out short term establishment of the communications link;
   if the change in state is the loss of the communications link, determining whether the communications link was established for at least a first period of time to be considered an acceptable connection to the remote data processing system, wherein the acceptable connection is present upon expiration of the connection timer that was started in response to the change in the state of the network being the re-establishment of the communication link; and
   creating a new serviceable event, if a second period of time passes without reestablishing the communications link to the remote data processing system.

2. The method of claim 1 further comprising:
   maintaining a duplicate counter that counts multiple duplicative state changes that occur within a third period of time.

3. The method of claim 1, further comprising:
   determining whether a prior serviceable event was created within a third period of time if the second period of time passes without reestablishing the communications link to a selected data processing system, wherein the new serviceable event is created if the prior serviceable event was not created within the third period of time.

4. The method of claim 1 further comprising:
   sending a notification of the new serviceable event to an administrator.

5. A method in a data processing system for monitoring for errors on a network, the method comprising:
- responsive to detecting a change in a state of the network, determining whether the change in state is a loss of a communications link to a remote data processing system;
- if the change in state is a loss of the communications link, determining whether the communications link was established for at least a first period of time to be considered an acceptable connection to the remote data processing system;
- creating a new serviceable event, if a second period of time passes without reestablishing the communications link to the remote data processing system;
- determining whether a prior serviceable event was created within a third period of time if the second period of time passes without reestablishing the communications link to the selected data processing system; and
- if a prior serviceable event was created within a third period of time, adding an indication of a new outage to the prior serviceable event instead of creating the new serviceable event.

6. The method of claim 1, wherein the remote data processing system is a logical partitioned data processing system having a plurality of logical partitions with each of the plurality of logical partitions (i) having at least one physical processor assigned thereto, and (ii) executing its own operation system which is a different instance from other operating systems executing on other of the plurality of logical partitions, and wherein the communications link is established by a partition in the logical partitioned data processing system.

7. The method of claim 1, wherein the first period of time and the second period of time are set by a user.

8. The method of claim 1, wherein the method is disabled when a partition is not active.

9. The method of claim 1, further comprising:
- creating the new serviceable event if a communications link is not established to the remote data processing system within a selected period of time.

* * * * *